United States Patent [19]

Noguchi et al.

[11] Patent Number: 5,535,093

[45] Date of Patent: Jul. 9, 1996

[54] PORTABLE COMPUTER DOCKING DEVICE HAVING A FIRST ROTATABLE CONNECTOR AND A SECOND CONNECTOR

[75] Inventors: Hiroyuki Noguchi, Fujisawa; Hideyuki Usui, Chigasaki; Kenshin Yonemochi, Kamakura, all of Japan

[73] Assignee: International Business Machines Corporation, Armonk, N.Y.

[21] Appl. No.: 416,391

[22] Filed: Apr. 6, 1995

[30] Foreign Application Priority Data

Jun. 20, 1994 [JP] Japan .................................. 6-136968

[51] Int. Cl.$^6$ .................................. G06F 1/16; H05K 7/10
[52] U.S. Cl. .................................. 361/686; 439/131
[58] Field of Search .................................. 439/131, 310; 364/708.1; 361/684–686

[56] References Cited

U.S. PATENT DOCUMENTS 5,299,089  3/1994  Lwee .................................. 361/684

*Primary Examiner*—Michael W. Phillips
*Attorney, Agent, or Firm*—Martin J. McKinley; Andrew J. Dillon

[57] ABSTRACT

A docking device for a portable computer which can be utilized with a number of portable computers having diverse sizes is disclosed. The docking device includes a body having a number of electronic components disposed therein adapted to be electrically connected to a portable computer. A surface supported by the body is adapted to slidably receive a portable computer selected from among the number of portable computers having diverse sizes. Adjacent to the surface, at least two electrical connectors are disposed, including a first connector rotatably supported by the body which is rotatable between a first position and a second position. The selected portable computer may be electrically connected to the number of electrical components via only the first electrical connector when the first electrical connector is in the first position and may be electrically connected to the number of electronic components via only the second electrical connector when the first electrical connector is in the second position. In a preferred embodiment, the surface is a tray which slides between a docked position at which the selected portable computer is electrically connected to the electronic components via one of the electrical connectors and an undocked position at which the selected portable computer is disconnected from the electronic components. According to a preferred embodiment, when the first electrical connector is in the first position, the first electrical connector extends further from the body along the direction in which the tray slides than the second electrical connector.

7 Claims, 10 Drawing Sheets

PORTABLE COMPUTER DOCKING DEVICE HAVING A FIRST ROTATABLE CONNECTOR AND A SECOND CONNECTOR

BACKGROUND OF THE INVENTION

1. Technical Field

The present invention relates in general to a system for data processing and in particular to an improved system for data processing utilizing a portable computer. Still more particularly, the present invention relates to a docking device to which a portable computer can be electrically connected to expand the functions of the portable computer.

2. Description of the Related Art

It is known in the art to use a computer docking device (also called docking station) having a bay structure which has space for accommodating fixed or detachable memory and the like, for expanding functions of portable computers. These computer docking devices (hereinafter also called docking devices) typically include a small computer system interface (SCSI), an interface of integrated device electronics (IDE), and an AT bus card, or other board having an expansion bus capable of connecting other devices such as communication adapters, so that a portable computer connected to the docking device has equivalent functions to those of a desktop personal computer. However, heretofore a docking device which can be used with multiple types of portable computers having different sizes has not been available.

To support multiple types of portable computers having different sizes, it is necessary to be able to electrically connect each type of portable computer to the docking device. This requires the docking device to use a number of connectors that accommodate corresponding types of portable computers. However, when a number of connectors are simply disposed on the docking device, it is likely that a connector for one type of portable computer interferes with or prevents the mounting of different types portable computers, or that the portable computer will contact and damage other connectors.

Referring now to FIG. 16, there is depicted connector 112 which protrudes from within docking device 110. As shown in FIG. 17, connector 112 can be linearly moved backward to avoid protrusion of connector 112 from body 115. However, in a design in which connector 112 moves linearly backward for escape, the amount of movement of connector 112 must be large, thereby increasing the susceptibility to failure of the coupling of connector 112. In addition, this design, coupled with a large amount of movement of connector 112, requires that cable 114, which contains a number of wires that connect connector 112 to connector 116, to bend as illustrated in FIG. 17. The acuteness of the bend could damage cable 114.

A second problem which arises in designing a docking station which may be utilized by two or more types of portable computers is how to implement a structure that can be utilized to decouple each type of portable computer from the docking device after operation of the device is completed. Decoupling each type of portable computer from the docking device requires an eject mechanism for each type of portable computer. However, incorporating a number of eject mechanisms in the docking device will complicate the structure and increase the manufacturing cost of the docking device.

Consequently, it would be desirable provide a docking device for portable computers which can be utilized with two or more types of portable computers. In addition, it would be desirable to provide a docking device for portable computers which compensates for the difference in size of portable computers and permits coupling of two or more types of portable computers of different sizes to the docking device by using a structure a retractable connector. Furthermore, it would be desirable to provide a docking device for portable computers which uses one simple eject mechanism to allow decoupling of two or more types of portable computers of different sizes.

SUMMARY OF THE INVENTION

It is therefore one object of the present invention to provide an improved data processing system.

It is another object of the present invention to provide an improved system for data processing utilizing a portable computer.

It is yet another object of the present invention to provide a docking station to which a portable computer can be electrically connected to expand the functions of the portable computer.

The foregoing objects are achieved as is now described. A docking device for a portable computer which can be utilized with a number of portable computers having diverse sizes is disclosed. The docking device includes a body having a number of electronic components disposed therein adapted to be electrically connected to a portable computer. A surface supported by the body is adapted to slidably receive a portable computer selected from among the number of portable computers having diverse sizes. Adjacent to the surface, at least two electrical connectors are disposed, including a first connector rotatably supported by the body which is rotatable between a first position and a second position. The selected portable computer may be electrically connected to the number of electrical components via only the first electrical connector when the first electrical connector is in the first position and may be electrically connected to the number of electronic components via only the second electrical connector when the first electrical connector is in the second position. In a preferred embodiment, the surface is a tray which slides between a docked position at which the selected portable computer is electrically connected to the electronic components via one of the electrical connectors and an undocked position at which the selected portable computer is disconnected from the electronic components. According to a preferred embodiment, when the first electrical connector is in the first position, the first electrical connector extends further from the body along the direction in which the tray slides than the second electrical connector.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
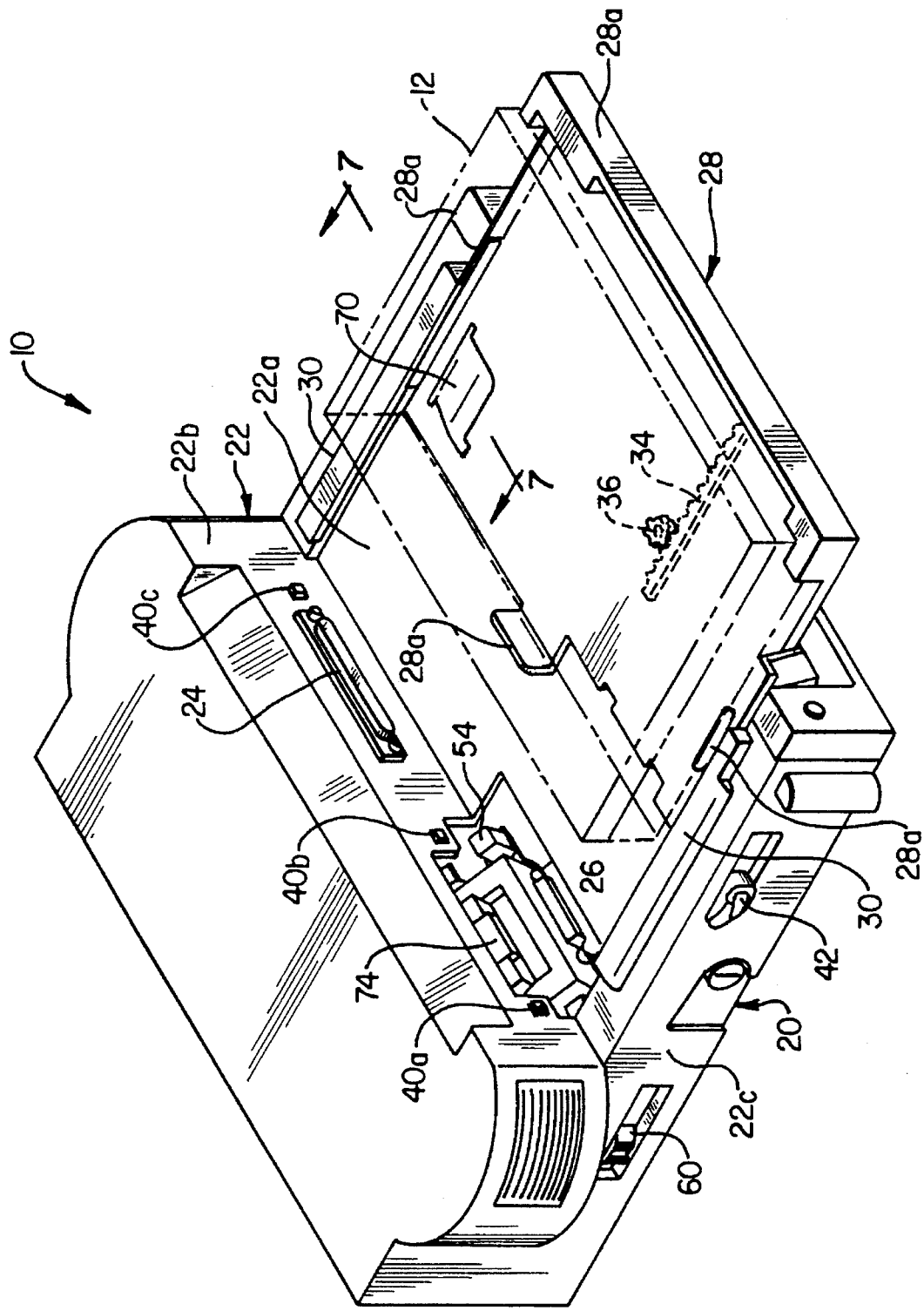
FIG. 1 illustrates an isometric view of an A4 size notebook personal computer mounted on a portable computer docking device in accordance with a preferred embodiment of the present invention.

With reference now to the figures and in particular with reference to FIG. 1, there is illustrated a portable computer docking device 10 in accordance with the present invention. Docking device 10 includes body 20 incorporating extensions, such as an AT bus card (not shown), and housing 22 which encloses body 20. Body 20 and housing 22 form a device body which makes up the main portion of docking device 10.

Attached to body 20 is connector 24 for an A4-size notebook personal computer (hereinafter called personal computer) 12, which is an example of a portable computer. Connector 24 protrudes from side wall 22B, which is vertical with respect to support surface 22A of housing 22 enclosing body 20. Formed on support surface 22A of housing 22 is a pair of guide members 30 which extends along a direction of the depth of body 20 parallel to the direction of protrusion of connector 24. Slidably supported on a pair of guide members 30 is a flat tray 28 on which personal computer 12 is mounted.

Figure 2:
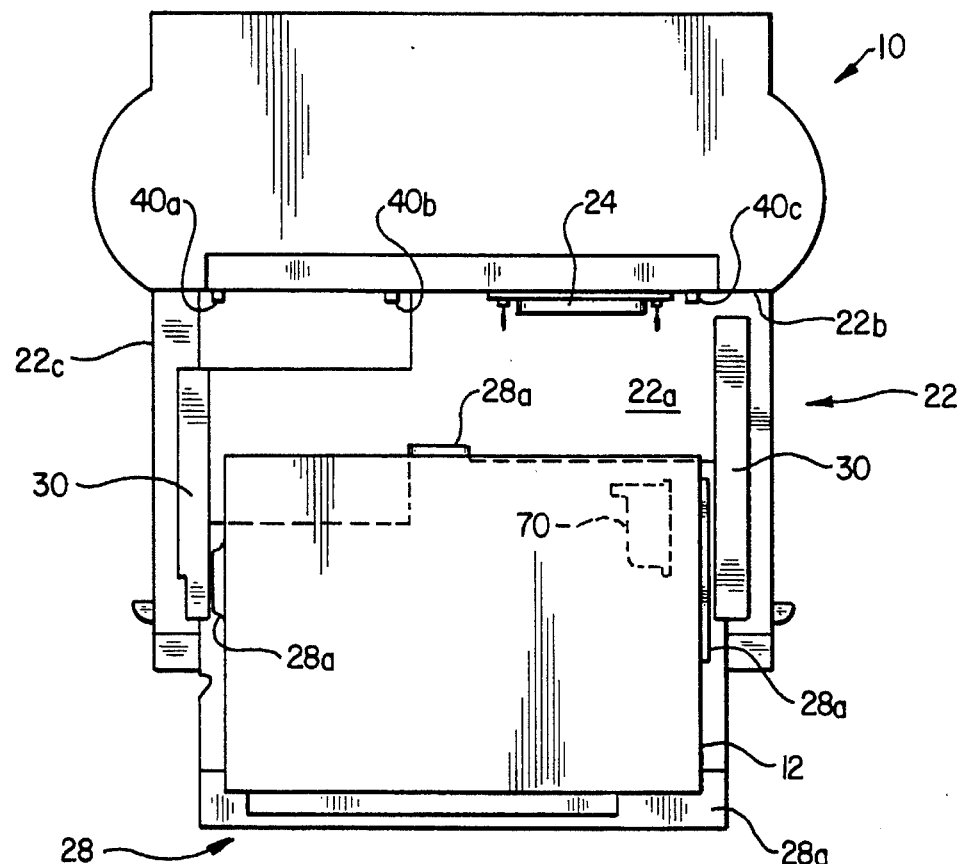
FIG. 2 depicts a top plan view of the A4 size notebook personal computer mounted on portable computer docking device in accordance with a preferred embodiment of the present invention, illustrating a tray located at a decoupling position.
Figure 3:
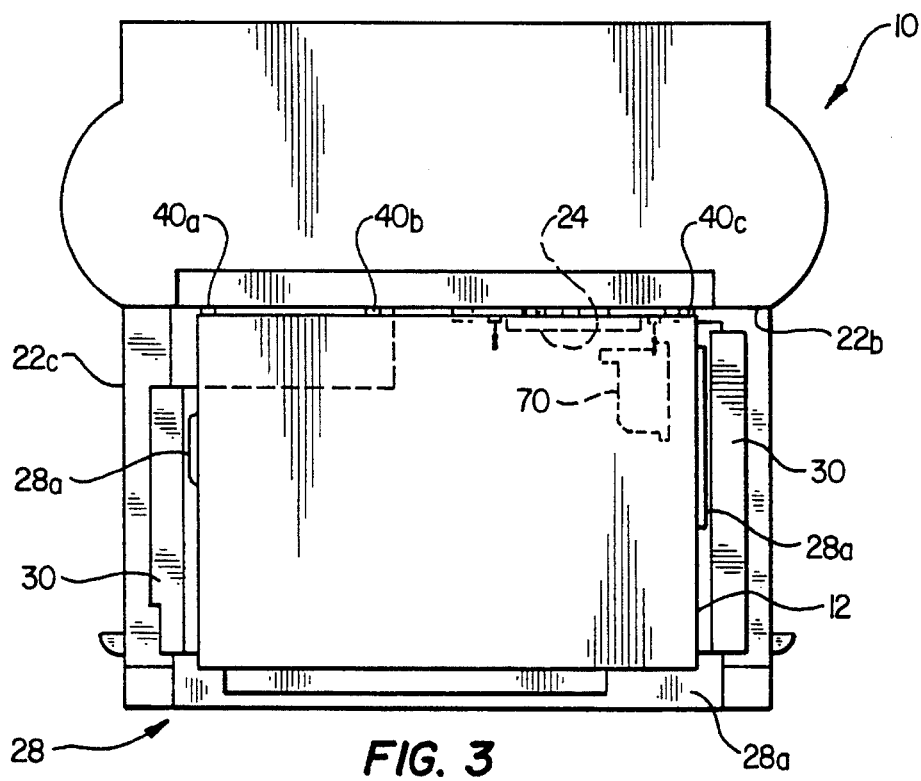
FIG. 3 illustrates a top plan view of the A4 size notebook personal computer mounted on the portable computer docking device in accordance with a preferred embodiment of the present invention, illustrating a tray located at a docking position.

Tray 28 slides between a decoupling position at which personal computer 12 is decoupled from connector 24, as depicted in FIG. 2, and a docking position where personal computer 12 is connected with connector 24, as illustrated in FIG. 3. At a periphery of the upper surface of tray 28, projecting guide wall 28A is formed for positioning personal computer 12 on tray 28. Personal computer 12 will thus be fixed on tray 28 by the use of this guide wall 28A.

Between tray 28 and body 20, a coil spring (not shown) is provided which forces tray 28 toward a position as shown in FIG. 1. Rack 34 is affixed to tray 28 and extends in the direction of sliding or movement of tray 28. Body 20 has a built-in damper (not shown) having pinion 36 which mates with rack 34. The coil spring acts to force tray 28 to extend toward the front (lower right side of FIG. 1) of body 20. Pinion 36 which mates with rack 34 turns slowly due to the resistance of the damper, thereby preventing abrupt movement of tray 28 from support surface 22A.

Three eject pins 40A, 40B, and 40C are supported in housing 22 so that they can project from side wall 22B. Eject lever 42 is provided in side wall 22C of housing 22 so that the eject lever is linked with eject pins 40A, 40B, and 40C within body 20 for projecting the pins from body 20. By moving eject lever 42 along side wall 22C of housing 22, eject pins 40A, 40B, and 40C are projected from wall 22B. Eject pins 40A, 40B, and 40C, eject lever 42, and a mechanism linking these members (not shown) form an eject mechanism.

Figure 9:
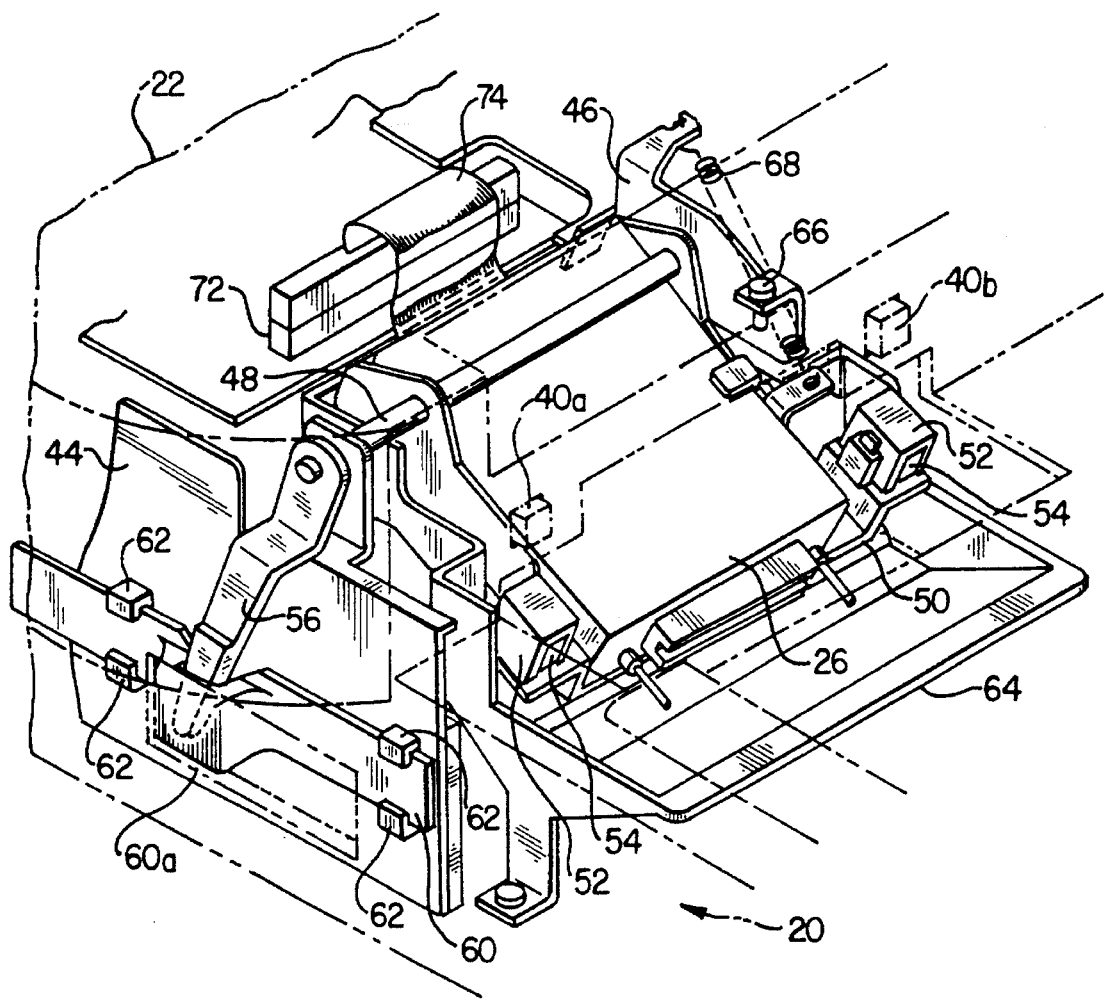
FIG. 9 illustrates an isometric view of a portion of the portable computer docking device in accordance with a preferred embodiment of the present invention, illustrating a connector located at a received position.

Referring now to FIG. 9, to the left-hand side of body 20 is fixed the bottom end of a pair of frame plates 44 and 46 which extend vertically. Axis of rotation 48 is rotatably supported by frame plates 44 and 46 and links frame plates 44 and 46. Support fixture 50 having a C-shaped cross section is affixed to axis of rotation 48. Support fixture 50 supports connector 26 for subnotebook personal computer 14 (hereinafter called personal computer 14), which is smaller than personal computer 12. At one end of axis of rotation 48, the base end of rotating lever 56 is secured. The tipped end of rotating lever 56 mates with U-shaped mating portion 60A provided in the central portion of rotating lever 60, which is movably guided in the horizontal direction with two pairs of guide members 62 formed on frame plate 44. Guide members 62 serve to guide operating lever 60 to move on frame plate 44. As operating lever 60 is moved, rotating lever 56 is rotated, which in turn rotates axis of rotation 48. Then, connector 26 is rotated round its base side together with support fixture 50. Thus, a handling means, formed of device members including axis of rotation 48, rotating lever 46, and operating lever 60, is linked to connector 26 and enables a user to rotate connector 26.

Figure 4:
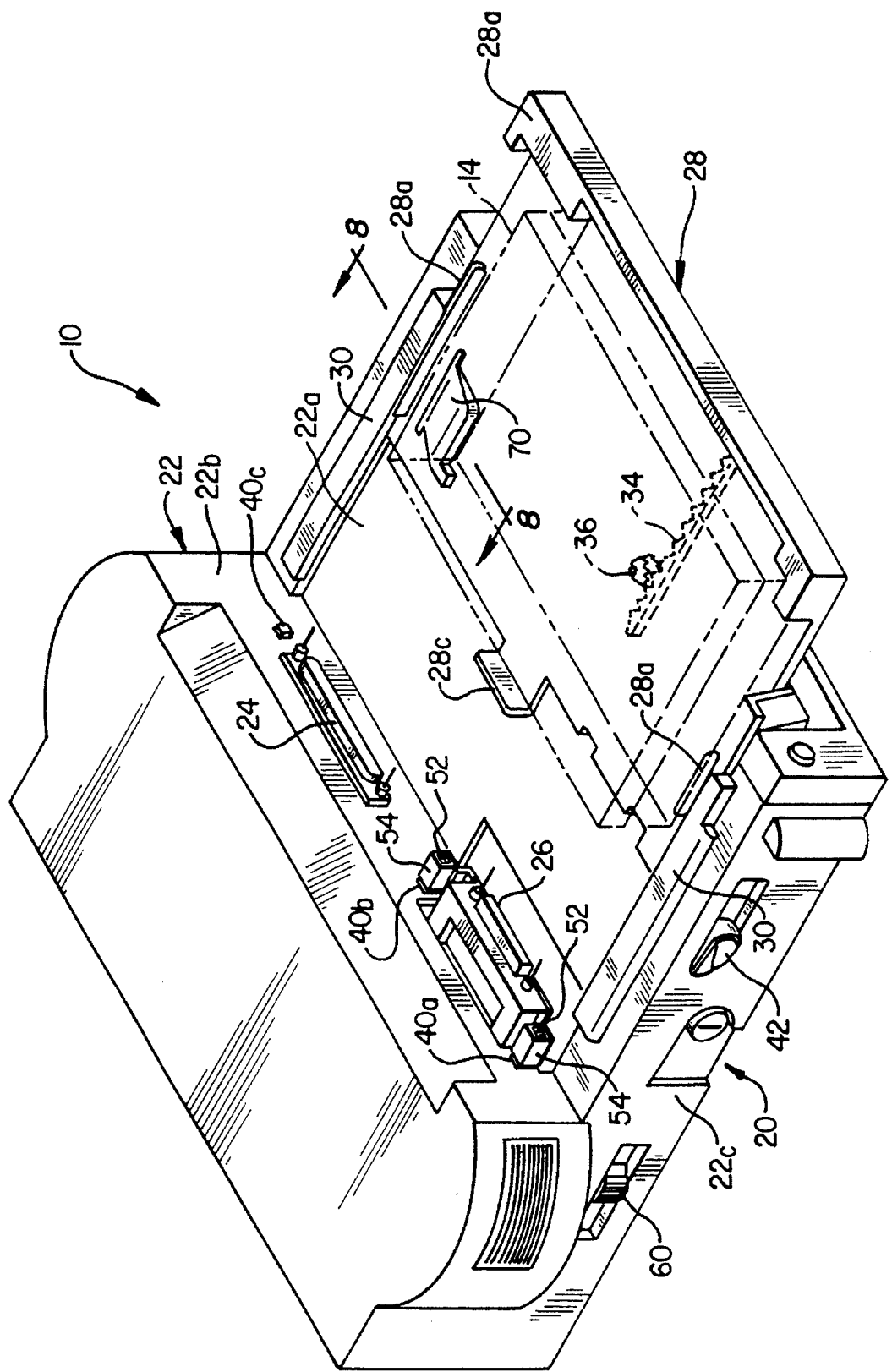
FIG. 4 depicts an isometric view of the subnotebook personal computer mounted on the portable computer docking device in accordance with a preferred embodiment of the present invention.
Figure 5:
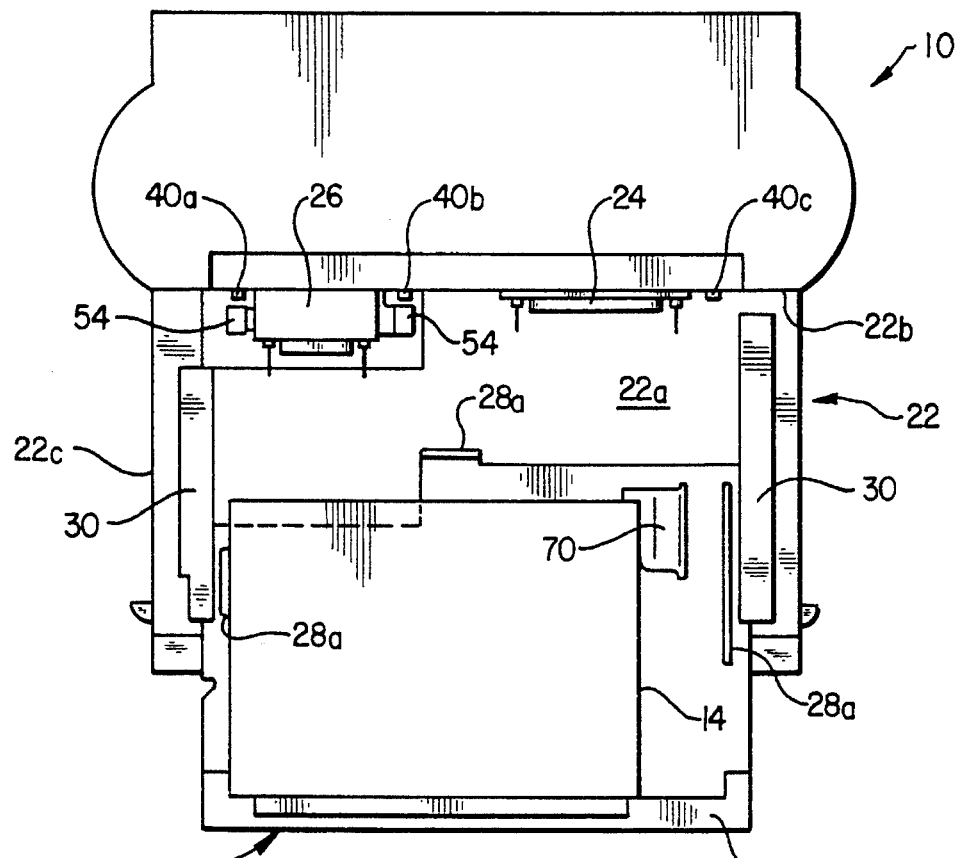
FIG. 5 illustrated a top plan view of the subnotebook personal computer mounted on the portable computer docking device in accordance with a preferred embodiment of the present invention, illustrating a tray located at the decoupling position.
Figure 6:
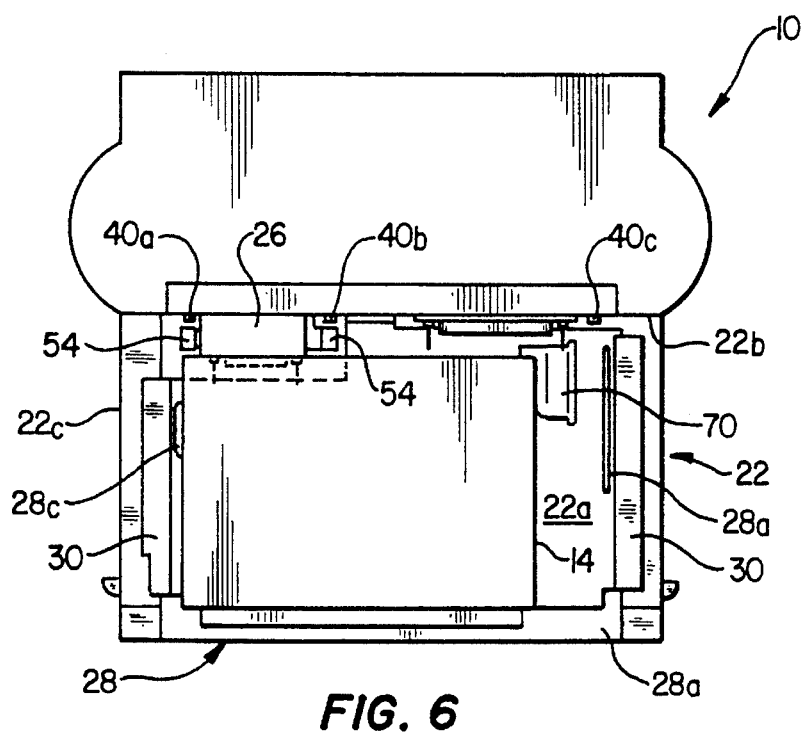
FIG. 6 depicts a top plan view of the subnotebook personal computer mounted on the portable computer docking device in accordance with a preferred embodiment of the present invention, illustrating the tray located at the docking position.
Figure 10:
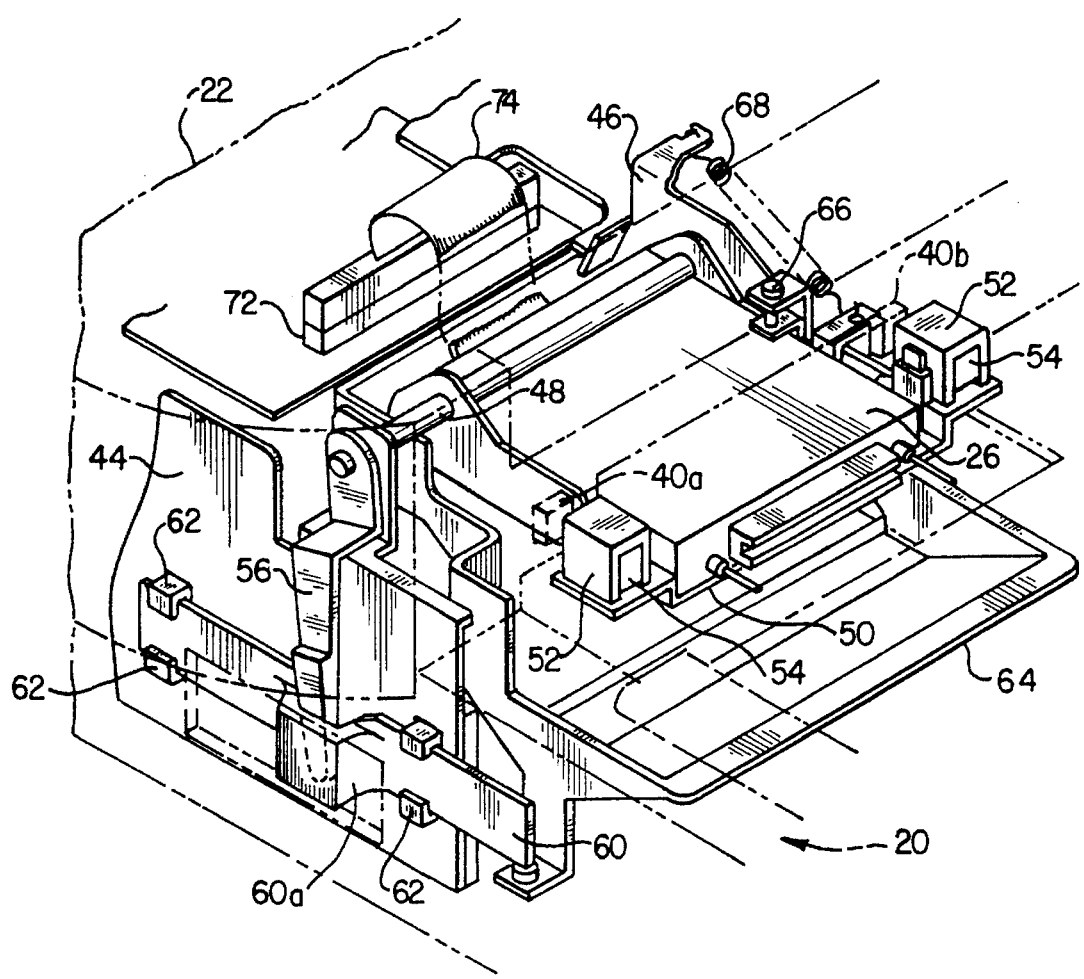
FIG. 10 depicts an isometric view of a portion of the portable computer docking device in accordance with a preferred embodiment of the present invention, illustrating the connector located at a connectable position.

Holding cover 64 is affixed to body 20 so as to be disposed below support fixture 50. Frame plate 46 has a stopper screw 66 fixed thereto. When the upper side of support fixture 50 is rotated downward, it contacts and stops at holding cover 64, and a stop position below support fixture 50 is determined. When the upper side of support fixture 50 is rotated upward, it contacts and stops at stopper screw 66, which is affixed to frame plate 46. Where support fixture 50 contacts stopper screw 66, a stop position above support fixture 50 is established at which connector 26 is disposed substantially in a horizontal direction. The lower stop position where the top end of connector 26 is down, as illustrated in FIG. 9, becomes a received position for retracting connector 26 into housing 22, and upper stop position where the top end of connector 26 is up, as depicted in FIG. 10, becomes a connectable position where connector 26 can be connected with personal computer 14. At the connectable position, connector 26 projects further than connector 24 along the sliding direction of tray 28. Thus, with connector 26 located at the connectable position, when personal computer 14 is mounted on tray 28 and slides therethrough, as shown in FIGS. 4–6, personal computer 14 will be connected with connector 26.

Coil spring 68 has one end connected to frame plate 46, which supports axis of rotation 48, and another end connected to support fixture 50, causing the upper side of support fixture 50 to be always actuated so as to be pulled toward the base end of frame plate 46. When support fixture 50 is rotated up to the connectable position, as shown in FIG. 10, the upper side of support fixture 50 will be further actuated so as to be pushed upward. When support fixture 50 is rotated up to the received position, as shown in FIG. 9, the upper side of support fixture 50 will be further actuated so as to be pushed downward. This function serves to prevent unintentional rotation of support fixture 50 and connector 26.

Figure 11:
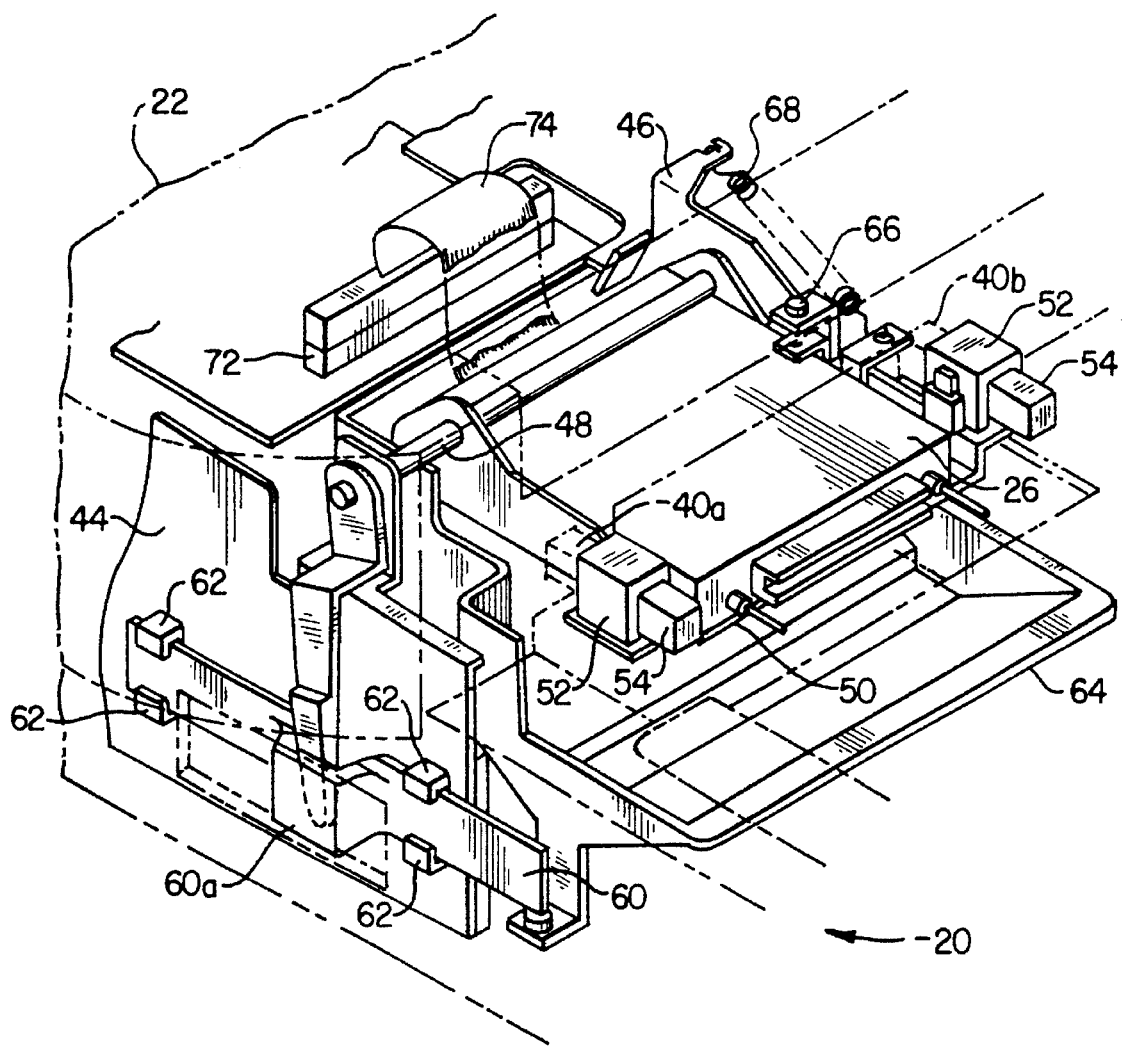
FIG. 11 illustrates an isometric view of a portion of the portable computer docking device in accordance with a preferred embodiment of the present invention, illustrating eject blocks being projected.

Support frames 52 are provided at positions corresponding to eject pins 40A and 40B in the left and central portion of housing 22, respectively, at the right and left ends of support fixture 50. In these support frames 52, eject blocks 54 are movably supported between the positions depicted in FIGS. 10 and 11. Eject blocks 54 are eject means interlocked with the eject mechanism for decoupling personal computer 14 from connector 26 of docking device 10. Eject blocks 54 are actuated by coil springs (not shown) so that eject blocks 54 stop at the position shown in FIG. 10. When connector 26 is in the connectable position and eject pins 40A and 40B project from side wall 22B, eject blocks 54 are pushed from the rear by eject pins 40A and 40B and project from support frames 52, as illustrated in FIG. 11.

Figure 7:
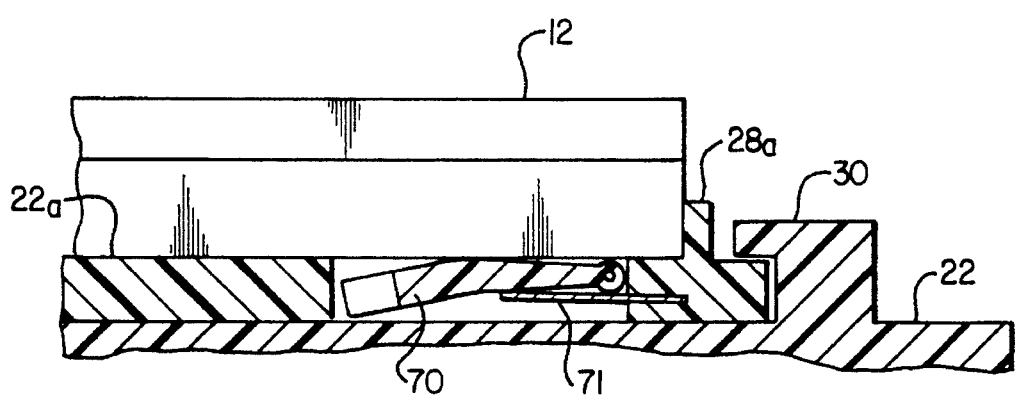
FIG. 7 illustrates a cross-sectional view, taken along line 7—7 in FIG. 1, of the portable computer docking device.
Figure 8:
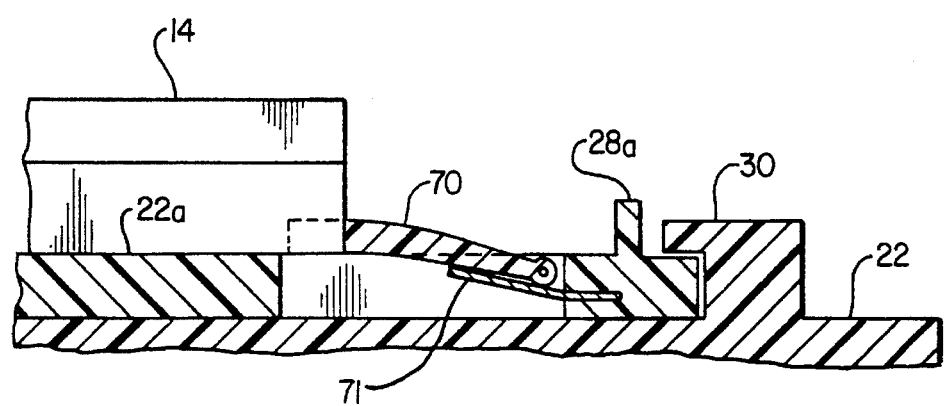
FIG. 8 depicts a cross-sectional view, taken along line 8—8 in FIG. 4, of the portable computer docking device.

Additionally, holding cover 64 has a switch (not shown) as a first detection means provided for detecting the status of connector 26. The switch turns on when connector 26 is in the connectable position. As depicted in FIG. 4, a second detection means is also provided for detecting the mounting of personal computer 12 on tray 28 to be connected with connector 24. Switch 70, which is supported by leaf spring 71, not only detects mounting of personal computer 12, but also acts as a guide for a periphery of personal computer 14. As shown in FIGS. 1 and 7, when personal computer 12 is mounted on tray 28, switch 70 is depressed and is thereby activated. As shown in FIGS. 4 and 8, when personal computer 14 is mounted on tray 28, switch 70 is released and is deactivated. When both the switch of holding cover 64 and switch 70 are activated, an alarm sound will be generated.

Cable 74 extends from the base end of connector 26 for personal computer 14 to connector 72 provided in body 20. Like connector 24, connector 26 is electrically connected with body 20 through cable 74. Because connector 26 rotates in unison with axis of rotation 48, the amount of slack in cable 74 varies slightly.

The operation of the depicted embodiment will now be described. To allow personal computers 12 and 14 corresponding to connectors 24 and 26 to be connected with and disconnected from connectors 24 and 26, respectively, tray 28 on which each of personal computers 12 and 14 may be mounted slides between the decoupling position depicted in FIGS. 2 and 5 and the docking position illustrated in FIGS. 3 and 6. To mount one of personal computers 12 and 14 to docking device 10, personal computer 12 or 14 is placed on tray 28, guided with tray 28 to the proper position, and properly connected with connector 24 or 26.

Conventionally, when a portable computer is mounted on a docking device, the portable computer is subjected to friction at its bottom surface when moved across the support surface of the docking device to be coupled with the connector of the docking device. This friction can cause damage to the docking device and portable computer or strip the protective coating from the surfaces of the portable computer and docking device. In accordance with the present invention, harmful friction is eliminated by the use of tray 28, which is slidable toward or away from major body 20, to mount personal computers 12 and 14.

Referring again to FIGS. 9 and 10, frame plates 44 and 46 of body 20 rotatably support the base end of connector 26 via support fixture 50 to permit rotation of connector 26 between the connectable position (depicted in FIG. 10), where connector 26 can be connected with personal computer 14, and the received position (illustrated in FIG. 9) where connector 26 can be retracted in body 20 through the use of operating lever 60 by the user. In this manner, connector 26 can be rotated and retracted into body 20, unless it is connected with personal computer 14. Thus, connector 26 is not an impediment to mounting personal computer 12 and is not in danger of being damaged when personal computer 12 is mounted. That is, since connector 26, which can be protruded to accommodate personal computer 14, can also be retracted within body 20, personal computer 12 will be prevented from making undesired contact with connector 26 when connector 26 is in its retracted position. Moreover, unlike a structure for linearly moving connector 26, the present invention provides a mechanism for rotating connector 26 to retract connector 26 into body 20, thus minimizing the movement of connector 26. Thus, the present invention decreases fatigue on the connection between connecter 26 and cable 74 and minimizes forced bending of cable 74. To disconnect personal computer 12 from body 20, the user moves eject lever 42, which causes eject pins 40A, 40B, and 40C to be projected from side wall 22B. Then, personal computer 12 is released from connector 24, and a coil spring acts to move tray 28 to the decoupling position, as shown in FIG. 2.

Similarly, when personal computer 14 is to be disconnected from body 20, the user moves eject lever 42, which causes eject pins 40A, 40B, and 40C to be projected from side wall 22B. This in turn projects eject blocks 54, which are pushed from behind by eject pins 40A and 40B, from support frames 52, and releases personal computer 14 from connector 26. Then, the coil spring acts to move tray 28 to the decoupling position, as shown in FIG. 5. Since eject blocks 54 compensate for the difference in size between personal computer 12 and personal computer 14, the same operation of the eject mechanism allows both personal computer 12 and personal computer 14 to be decoupled from body 20, despite their difference in size.

Figure 12:
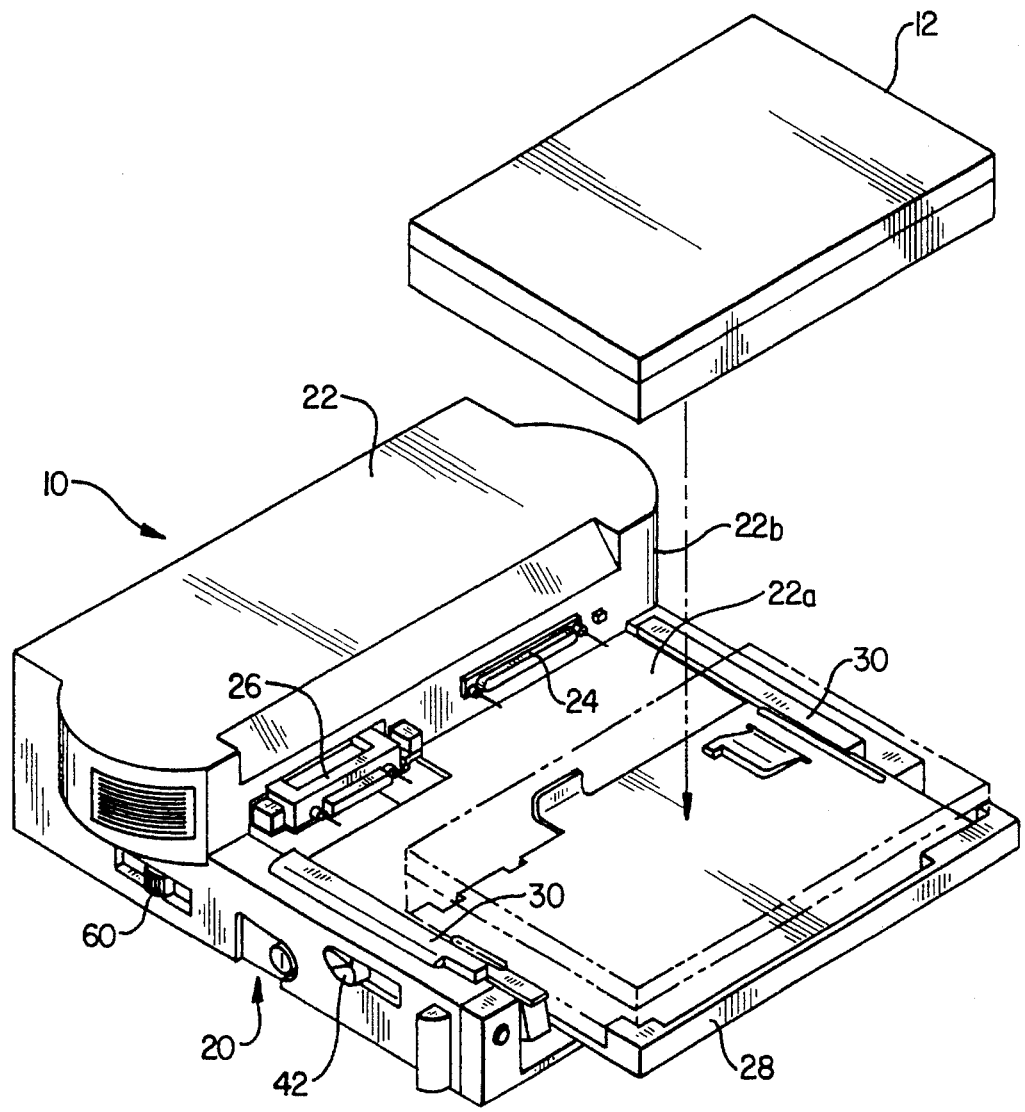
FIG. 12 depicts an isometric view of the A4 size notebook personal computer mounted on the portable computer docking device in accordance with a preferred embodiment of the present invention, illustrating the connector being located at the connectable position.
Figure 16:
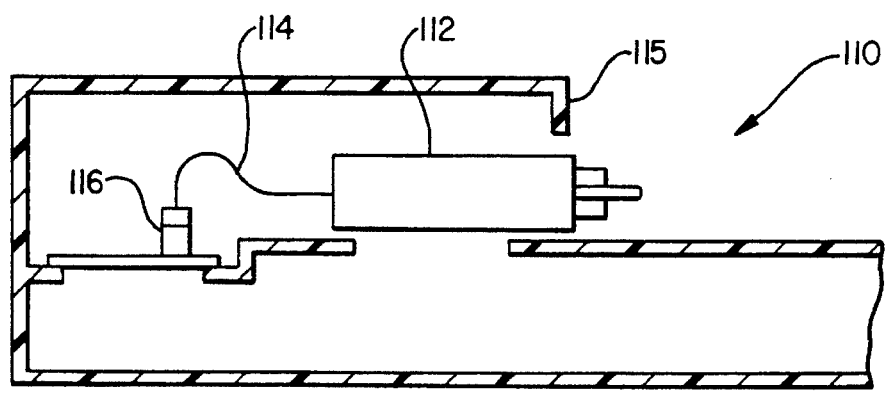
FIG. 16 depicts a cross-sectional view of a conventional portable computer docking device, illustrating a connector projected.
Figure 13:
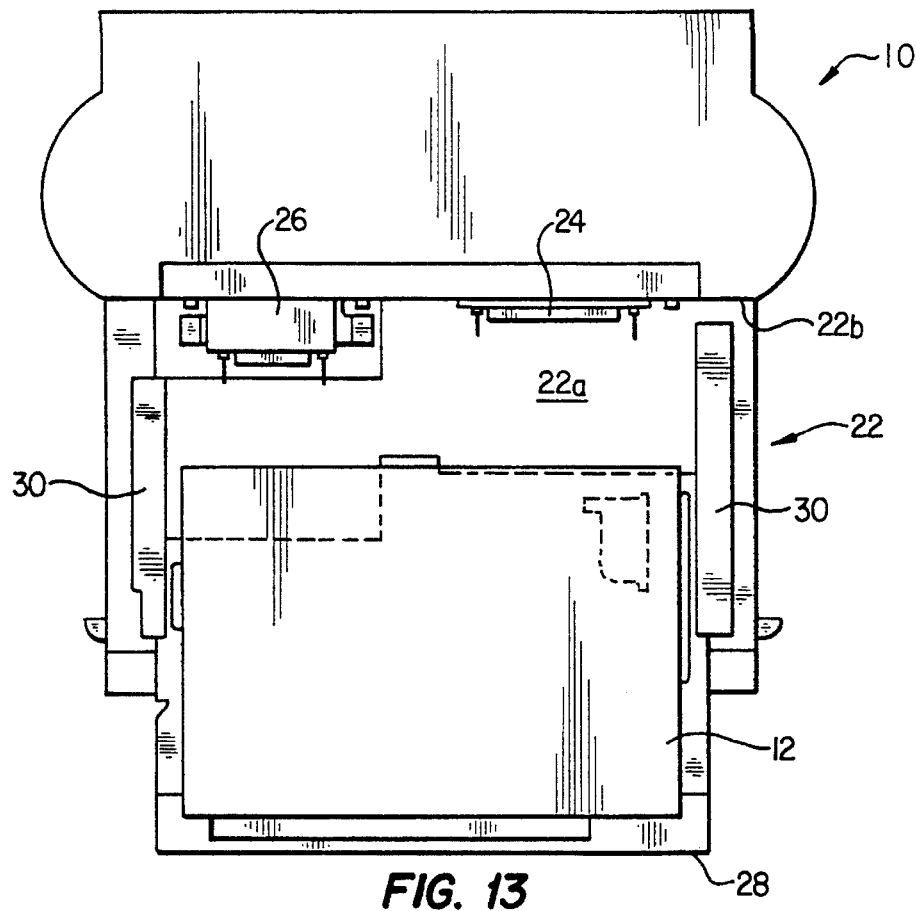
FIG. 13 illustrates a top plan view of the A4 size notebook personal computer mounted on the portable computer docking device in accordance with a preferred embodiment of the present invention, illustrating the connector located at the connectable position.
Figure 15:
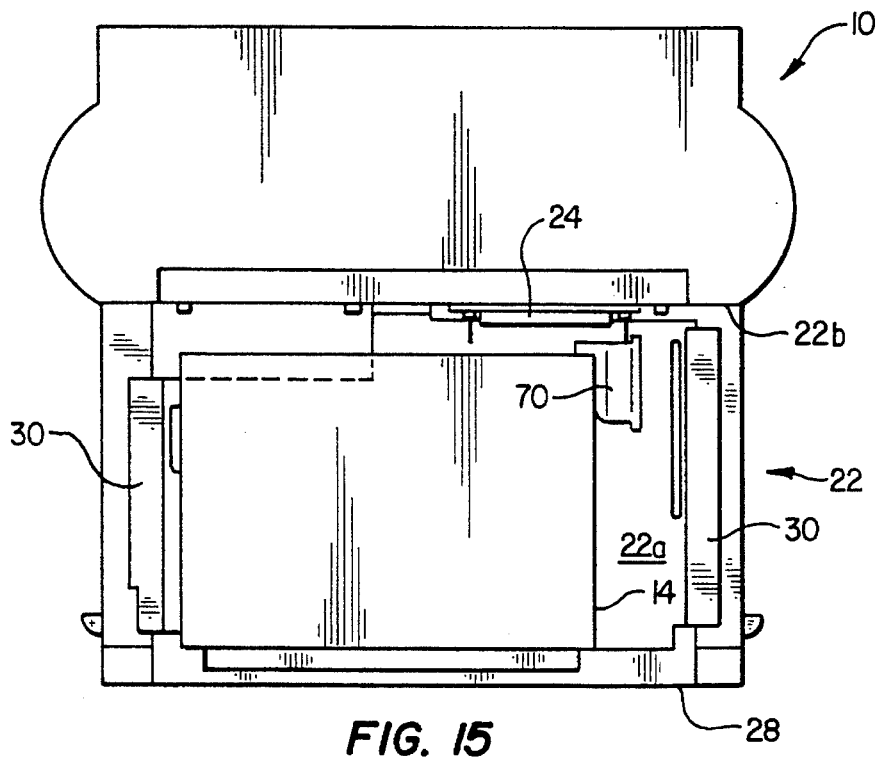
FIG. 15 illustrates a top plan view of the subnotebook personal computer mounted on the portable computer docking device in accordance with a preferred embodiment of the present invention, illustrating the connector located at the received position.
Figure 14:
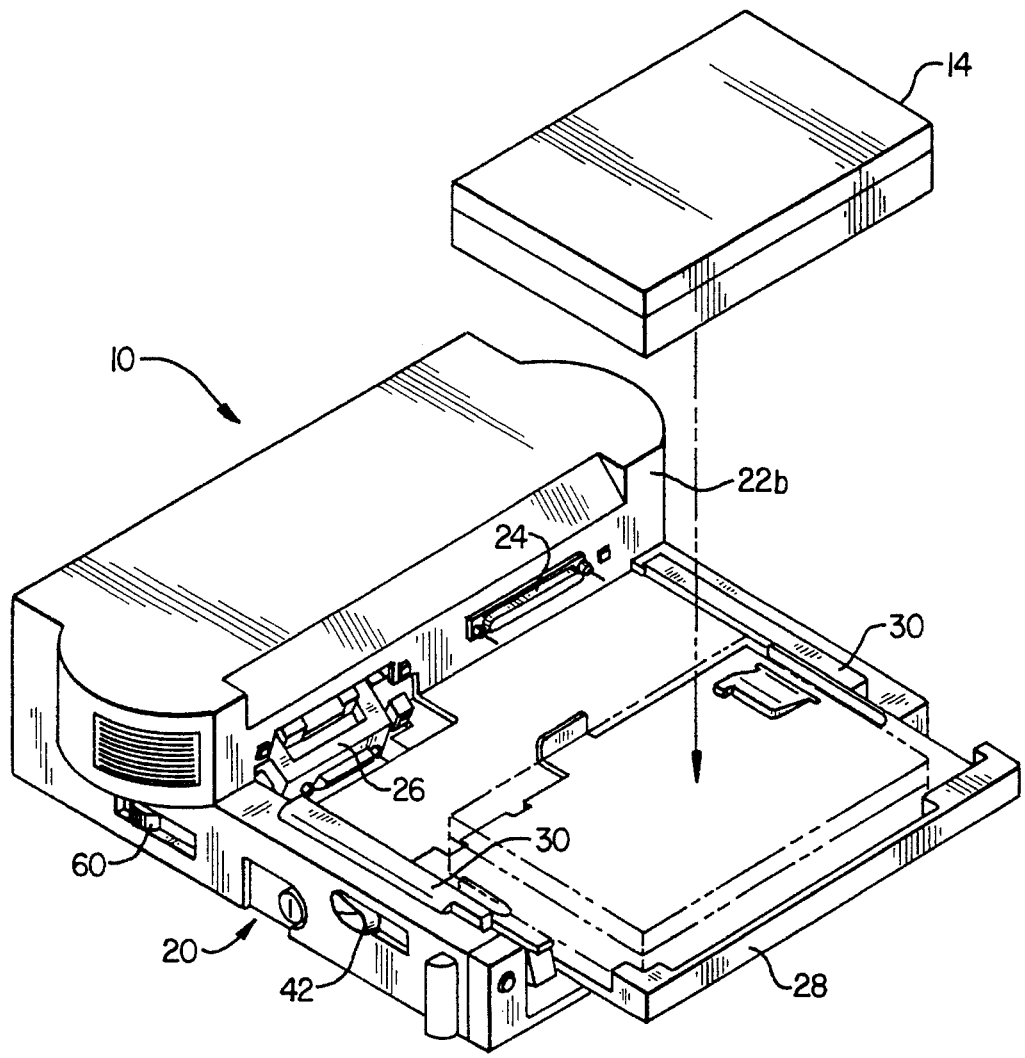
FIG. 14 depicts an isometric view of the subnotebook personal computer mounted on the portable computer docking device in accordance with a preferred embodiment of the present invention, illustrating the connector located at the received position.
Figure 17:
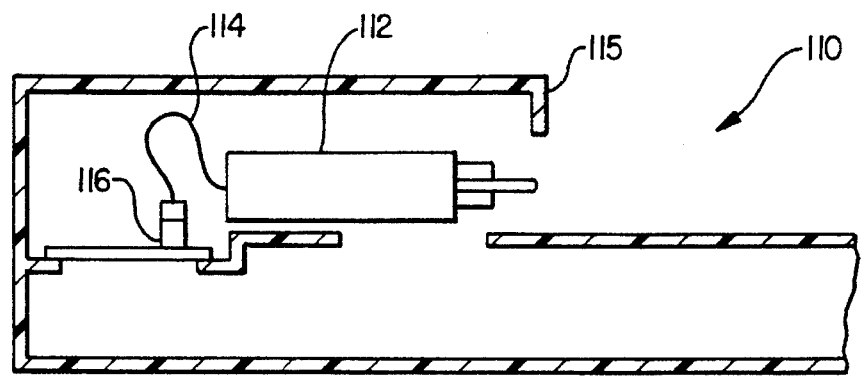
FIG. 17 illustrates a cross-sectional view of the conventional portable computer docking device, illustrating the connector retracted into the docking device.

When connector 26 is in the connectable position, as depicted in FIGS. 12 and 13, and the user tries inadvertently to mount personal computer 12 on tray 28, switch 70 is activated by personal computer 12. Since the switch of holding cover 64 is turned on, an alarm sound is generated to indicate an operation error. Consequently, personal computer 12 is prevented from making contact with connector 26. When connector 26 is in the received position, as illustrated in FIGS. 14 and 15, and the user attempts to mount personal computer 14 on tray 28, personal computer 14 will not contact connector 24 because computer 14 has a smaller size then personal computer 12.

In the embodiment described above, although portable computers have been illustrated as two types of personal computers 12 and 14, three or more types of personal computers may be utilized with a single docking device 10. In such cases, three or more connectors may be provided in docking device 10. In addition, although the aforementioned embodiment contemplates use of one or more types of portable computers having different sizes, all types of portable computers may have the same size.

As described above, a portable computer docking device in accordance with the present invention enables two or more types of portable computers to be mounted and utilized. A preferred embodiment of the present invention provides that the retractable structure employed for the connector compensates for the difference in size of portable computers and thus allows two or more types of portable computers having different sizes to be connected. In addition, the present invention provides a simple, single eject mechanism which permits two or more types of portable computers having different sizes to be decoupled from the docking device.

While the invention has been particularly shown and described with reference to a preferred embodiment, it will be understood by those skilled in the art that various changes in form and detail may be made therein without departing from the spirit and scope of the invention.

I claim:

1. A docking device for a portable computer, comprising:
   a body having a plurality of electronic components disposed therein which are adapted to be electrically connected to a portable computer;
   a surface supported by said body, wherein said surface is adapted to slidably receive a portable computer selected from among a plurality of portable computers having diverse sizes; and
   at least two electrical connectors disposed adjacent to said surface, wherein a first electrical connector is rotatably supported by said body and is rotatable between a first position and a second position, such that a selected portable computer may be electrically connected to said plurality of electronic components via only said first electrical connector when said first electrical connector is in said first position and may be electrically connected to said plurality of electronic components via only a second electrical connector when said first electrical connector is in said second position.

2. The docking device for a portable computer of claim 1, wherein said surface comprises a tray that slides between a docked position at which said portable computer selected from among said plurality of portable computers is electrically connected to one of said at least two electrical connectors and an undocked position at which said portable computer selected from among said plurality of portable computers is disconnected from said one of said at least two electrical connectors.

3. The docking device for a portable computer of claim 2, and further comprising:
   means for rotating said first electrical connector between said first and said second positions.

4. The docking device for a portable computer of claim 3, wherein said first electrical connector extends further from said body along a direction in which said tray slides than said second electrical connector when said first electrical connector is in said first position.

5. The docking device for a portable computer of claim 3, and further comprising:
   a first detection means for detecting whether said first electrical connector is in said first position; and
   a second detection means for detecting that a portable computer selected from among said plurality of portable computers having diverse sizes which corresponds to said second electrical connector has been received on said tray.

6. The docking device for a portable computer of claim 5, and further comprising:
   means for alerting a user of an error in response to detection by said first and said second detection means that said first electrical connector is in said first position and that a portable computer which correspond to said second electrical connector has been received on said tray.

7. The docking device for a portable computer of claim 1, wherein said first electrical connector includes means for ejecting said selected portable computer from said docking device, wherein said means for ejecting interlocks with an eject mechanism provided in said body to eject other portable computers among said plurality of portable computers having diverse sizes from said docking device.

\* \* \* \* \*